Dec. 11, 1928.
E. L. JOSEPH
1,695,237
FILTER FOR AIR AND OTHER GASES
Filed Nov. 18, 1924
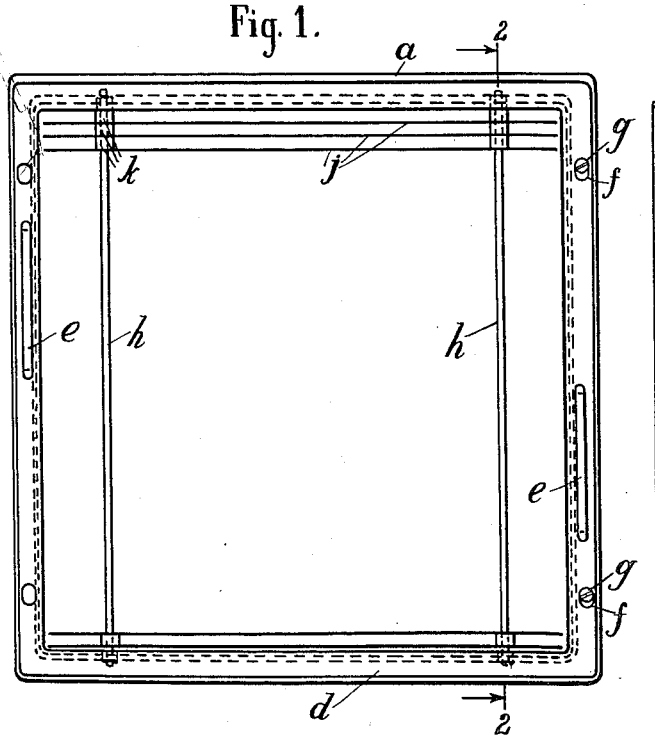
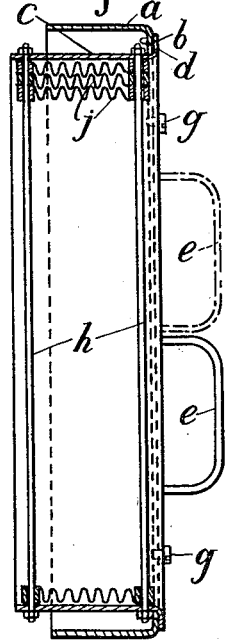
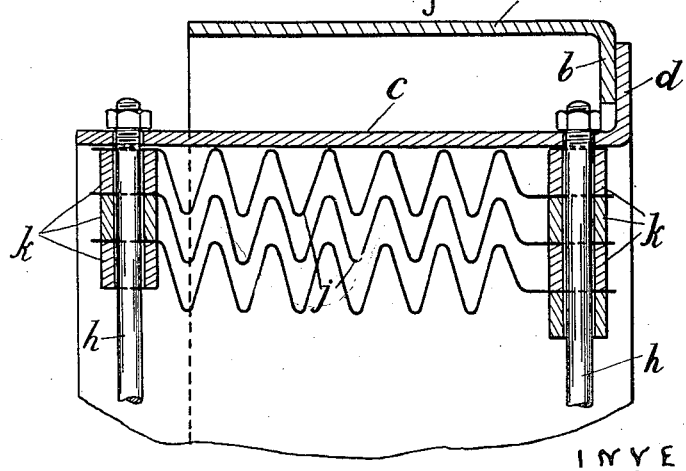
INVENTOR:
Edward Lionel Joseph
BY: Francis E. Boyce
ATTORNEY Patented Dec. 11, 1928.

1,695,237

UNITED STATES PATENT OFFICE.

EDWARD LIONEL JOSEPH, OF LONDON, ENGLAND.

FILTER FOR AIR AND OTHER GASES.

Application filed November 18, 1924, Serial No. 750,524, and in Great Britain March 7, 1924.

Various means have been proposed for filtering air and other gases, from a simple screen of reticulated material to elaborate washing devices in which the gas is passed through an atmosphere of water or other liquid in a finely divided state. The former have the disadvantage that the material soon becomes clogged and must be replaced whilst the latter are expensive to erect and run, the air or other gas must usually be dried before use, and in cold weather heating is necessary. The object of the present invention is a simple form of apparatus which can be cheaply and rapidly constructed, is economical in use and requires very little attention.

According to this invention a filter comprises a series of corrugated, crimped or similar metal plates superimposed in spatial relationship and supported within an inner frame so as to form sinuous passages, said inner frame being removably mounted in an outer frame or the like in order that said inner frame and plates may be removed and dipped into a heavy viscous oil, glycerine or the like adapted to retain solid matter in the air or gas. Preferably the plates are assembled and retained in the removable inner frame by means of rods passed through apertures in said frame and plates and through tubular distance pieces.

In the accompanying drawings Figure 1 is a front elevation of one form of filter constructed in accordance with this invention, Figure 2 is a section on the line 2—2 Figure 1, and Figure 3 is a similar partial section on an enlarged scale.

As shewn, an outer rectangular frame $a$ is formed with an inturned flange $b$ and is adapted to receive a removable frame $c$ formed with an out-turned flange $d$ adapted to overlie the flange $b$. The frame $c$ is furnished with staggered handles $e\ e$ in order that it may be lifted readily into and out of the frame $a$ and its flange is formed with key hole slots $f \ldots$ adapted to co-operate with screws, headed pins or the like $g \ldots$ on the flange $b$. Vertically disposed between, and clamped to, the upper and lower walls of the frame $c$ are two pairs of rods $h\ h$ and on these rods is arranged in spatial relationship a series of crimped sheet metal plates $j \ldots$ tubular distance pieces $k \ldots$ being disposed on the rods $h$ between the flat ends of adjacent plates $j$ before said rods are clamped in position. It will be observed that the frame $c$ and the plates $j \ldots$ carried thereby can be removed easily from the frame $a$ (which may be regarded as a permanently fixed structure) and replaced after being dipped in a heavy viscous oil. When air is forced or drawn through the filter it is constrained to pass through a series of sinuous passages in which eddy currents are set up, with the result that any solid impurities in the air are caused to impinge on, and adhere to the oily surfaces of the walls of said passages. The sinuous passages are provided by making the crimps or corrugations relatively deep and with sharp angled portions, as shown in Figure 3, and disposing the plates $j$ sufficiently close together to intermesh but at the same time to be spaced apart. This structure is obtained by the relatively short spacing sleeves $k$ which may be varied within the prescribed limits to provide sinuous passages of different heights and at the same time to cause the air, and particles carried thereby, to impinge against the inclined portions of the plates. The vertical rods $h$ hold the plates horizontally so that the sinuous passages present superposed series or rows of deep depressions or pockets between narrow inclined passages which provide a large number of independent deep traps within which are set up eddy currents, insuring impact against the wall of the traps, and zones of quietude in which the dust particles may settle. This insures the independent separation of the foreign matter from the air at various points throughout the thickness, height and width of the filter. When required the frame $c$ may be removed, dipped in a cleansing agent, again dipped in oil or the like and replaced.

The frames such as $a$ are preferably formed with any convenient interlocking means (not shown) so that any number of such frames may be secured together in juxtaposition to build up a filter of any desired capacity.

The form of the plates $j$ may be varied according to requirements, whilst in order to vary their spatial relationship it is only necessary to provide distance pieces $k \ldots$ of different axial length.

Heretofore, in filters of this general type it has been considered necessary to dispose the baffle bars, or other obstacles to entrap the dust and other foreign particles from the air, in upright position with the sinuous passages extending from top to bottom of the frame. Water or other suitable fluid in bath form is usually disposed at the bottom of the bars for catching the entrapped particles. Unless the filter frame and group of bars is relatively thick, very little dust is entrapped at the bottom of the frame because the particles separated from the upper stratum drop into the adjacent lower stratum and are carried forward thereby at least a short distance before separation from the second stratum together with the particles initially carried by the second stratum.

Thus, each lower stratum has the burden of its own particles plus the particles separated from all of the superposed strata, and at each lower stratum the falling particles are gradually advanced through the filter. The result is that the lower strata entrain more particles in passing through the filter than they initially carried.

The present invention separately and thoroughly entraps the particles from the separate strata, and prevents the particles from an upper stratum falling into a lower stratum. The lowermost stratum is as easily cleared of its particles as is the top-most stratum.

In the prior art such is not the case as the particles collected from the upper strata are deposited in the lower strata; making it harder to clean the lower strata. Thus objection to the prior art devices is applicable to the type utilizing a viscous coating on the bars as there is a downward accumulation of the particles throughout the height of the bars.

What I claim is:—

1. A filter for air and other gases, comprising an outer frame, an inner frame removably mounted in the outer frame and open at its front and rear faces to admit passage of air through the frame and closed at its opposite sides, and a plurality of plates arranged horizontally in superposed relation in the inner frame and extending between the front and rear faces thereof to divide the air into independent horizontal strata, said plates having relatively deep and sharp transverse crimps extending from side to side in the inner frame, said plates being spaced apart with the sharp angle portions of one plate overlapping the sharp angle portions of an adjacent plate to provide narrow passages between the inclined portions of adjacent plates and wide and deep pockets between the angle portions of adjacent plates, said narrow passages between the inclined portions of the plates being of less cross sectional area than that of the wide and deep pockets between the crimps of adjacent plates, the deep pocket in the angle of each crimp providing a zone of quietude between adjacent narrow passages in which dust particles may be entrapped.

2. A filter for air and other gases, comprising an outer frame, an inner frame removably mounted in the outer frame and open at its front and rear faces to receive a current of air therethrough and closed at its opposite sides, vertically disposed rods in the inner frame, horizontal plates mounted on the rods and extending between the front and rear faces of the frame, spacers on the rods between the plates to separate the same vertically and divide the air stream into independent strata, said plates being crimped on relatively sharp angles with relatively deep inclined portions to provide at all spacing adjustments of adjacent plates relatively deep trap pockets between the angles of adjacent plates and relatively narrow passages at opposite sides of the pockets between the inclined portions of the adjacent plates, said narrow passages between the inclined portions of the plates being of less cross sectional area than that of the wide and deep pockets between the crimps of adjacent plates.

In testimony whereof I affix my signature.

EDWARD LIONEL JOSEPH.